(12) United States Patent
Roth et al.

(10) Patent No.: US 9,455,963 B1
(45) Date of Patent: Sep. 27, 2016

(54) LONG TERM ENCRYPTED STORAGE AND KEY MANAGEMENT

(71) Applicant: Amazon Technologies, Inc., Reno, NV (US)

(72) Inventors: Gregory Branchek Roth, Seattle, WA (US); Eric Jason Brandwine, Haymarket, VA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/575,676

(22) Filed: Dec. 18, 2014

(51) Int. Cl.
*H04L 9/32* (2006.01)
*H04L 29/06* (2006.01)
*G06F 1/26* (2006.01)
*G08B 29/00* (2006.01)

(52) U.S. Cl.
CPC ......... *H04L 63/0428* (2013.01); *H04L 63/061* (2013.01)

(58) Field of Classification Search
CPC ..... H04L 9/08; H04L 63/061; H04L 9/0844; H04L 63/0428; H04W 12/04
USPC ........................ 380/28–30, 44–47, 255–286; 713/150–154, 160–167, 171, 189–193
See application file for complete search history.

(56) References Cited

U.S. PATENT DOCUMENTS

| | | | |
|---|---|---|---|
| 2014/0009419 A1* | 1/2014 | Kim | ...................... G06F 3/0412 345/173 |
| 2015/0082022 A1* | 3/2015 | Marinkovic | ........ H04L 63/0442 713/153 |
| 2015/0281191 A1* | 10/2015 | Mardikar | ............ H04L 12/5895 713/153 |

* cited by examiner

*Primary Examiner* — Evans Desrosiers
(74) *Attorney, Agent, or Firm* — Hogan Lovells US LP

(57) ABSTRACT

An encryption key not accessible outside a data storage device can be used to encrypt data stored in that device. The received data may have been encrypted under an external key, such as a key associated with a customer of a data storage service. Upon receiving the data encrypted under the external key, the data can be decrypted using a copy of the external key and then re-encrypted, inside the data storage device, using the internal key. If the external key is to be rotated, the stored data does not need to be modified as the data can be decrypted using the internal key and then re-encrypted using the new external key in response to an authorized request for the data after the change to the new external key. Such an approach provides near instant key rotation while not having to re-encrypt data under the new key unless requested.

21 Claims, 11 Drawing Sheets

LONG TERM ENCRYPTED STORAGE AND KEY MANAGEMENT

BACKGROUND

The security of computing resources and associated data is of high importance in many contexts. As an example, organizations often utilize networks of computing devices to provide a robust set of services to their users. Networks often span multiple geographic boundaries and connect with other networks. An organization, for example, may support its operations using both internal networks of computing resources and computing resources managed by others. Computers of the organization may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold is secure can be challenging, especially as the size and complexity of such configurations grow.

One of the endemic problems in storage encryption is that the amount of data stored can be quite large, and can require storage over a long period of time. Due to the length of time the data is stored, it is important that security is managed properly over that time. Any mistake in security management can be difficult to correct due to the sheer volume of data that is stored. Further, the need to decrypt and re-encrypt large volumes of data can require a significant amount of resources. Various approaches have introduced key rotation for securing data, where the key used to access specific data will change over time. Such a change has to happen relatively quickly, however, in order to avoid problems with certain portions of the data being secured with the old key while other portions have been switched over to the new key. Certain approaches attempt to obfuscate the key used for encryption, such as by providing a wrapper for the key such that the wrapper can be changed to manage the security change. Difficulties can arise, however, when a customer does not have access to the new wrapper for the current key.

BRIEF DESCRIPTION OF THE DRAWINGS

Various embodiments in accordance with the present disclosure will be described with reference to the drawings, in which.

DETAILED DESCRIPTION

Figure 1:
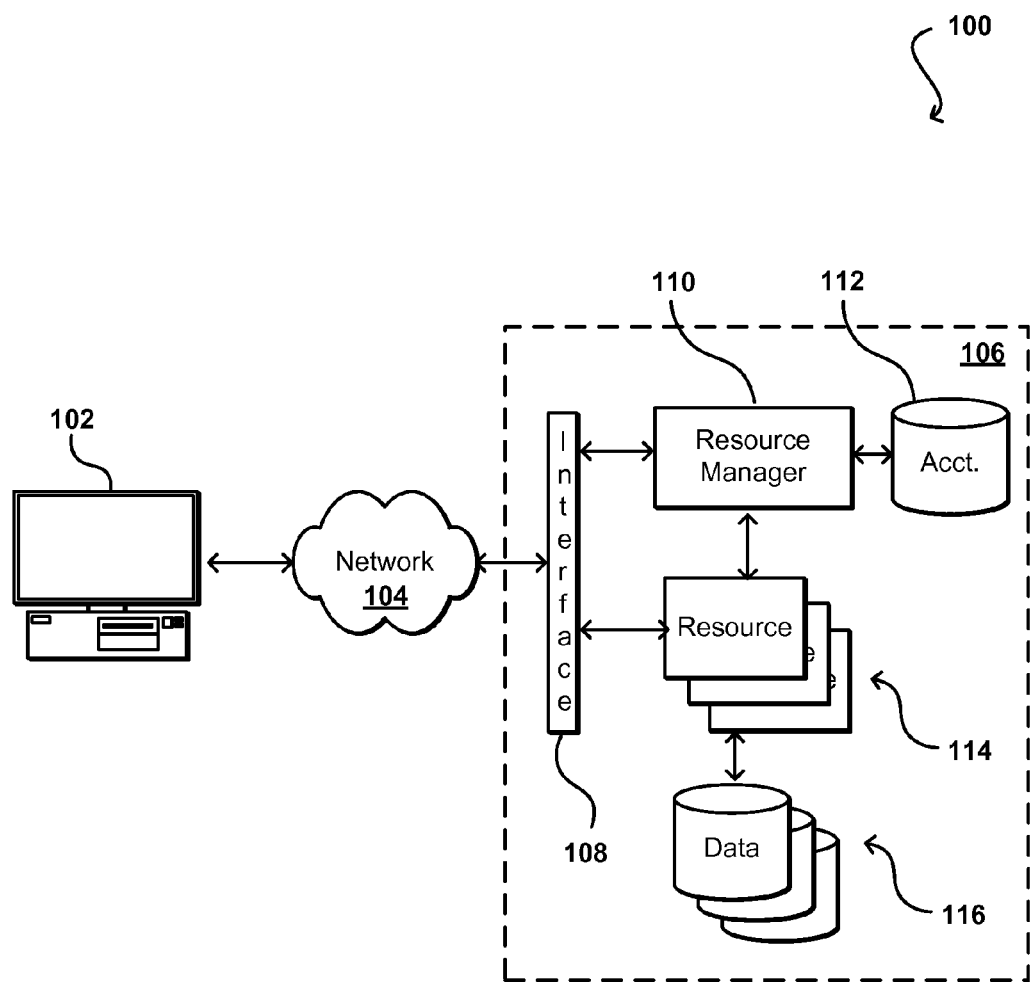
FIG. 1 illustrates an example environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the storage of data, as may be performed in a single storage device, a distributed system, or a data storage service, among other such options. A user, such as a customer of a multi-tenant service provider, may want to cause encrypted data to be stored in a data storage service, such as may include a disk array provided by the service provider in a multi-tenant environment. The user might want to encrypt the data using a specific cryptographic key, as may be obtained from a key management service or other such source. The user can cause the data to be encrypted under the specified key and transmitted to the data storage service for storage (or another such data storage operation).

A data storage system in the multi-tenant service provider environment can receive the encrypted data and cause the data to be stored in its encrypted form. In various embodiments, the data storage service can also receive a copy of the key that was used to encrypt the user data. The data storage service then can have the ability to decrypt the data using the key, in order to cause ciphertext to be converted to cleartext or plaintext, for example. While the data storage service could store the cleartext, the user (or service provider, etc.) may prefer to have the data stored in encrypted form for security purposes. While the device could utilize a key obtained from a source such as a key management source, the availability of the key outside a device could potentially enable a third party to decrypt the data upon obtaining a copy of that key.

Accordingly, approaches in accordance with various embodiments can enable each individual storage device to utilize a respective cryptographic key that is generated within the storage device and inaccessible outside the device. Data that is received encrypted under a first key, available outside the storage device, can be decrypted using a copy of that first key. That decrypted data then can be re-encrypted under a second key that is generated within the storage device and inaccessible outside the device. For example, the internal key might be stored in a tamper-resistant cryptographic co-processor or other tamper-resistant hardware on the storage device. Such an approach enables the data to be securely stored while encrypted under a key that cannot be obtained or exported outside the device using an interface of the device. When the user subsequently wants to receive the data back, the stored data can be decrypted using the second key and provided to the user. The data can be sent in cleartext or re-encrypted using the first key, such that the user can receive back the data in an encrypted form that is able to be decrypted by the user.

In some cases, the data that is returned to the user can be re-encrypted using a different key than was used to encrypt the data that was sent to the data storage service. For example, the user might provide a new key to the data storage service, or a new key might be sent (i.e., from a key management service) to both the user and the data storage service as part of a key rotation process. In some embodiments, the data storage service might have received multiple keys with timestamps that can be stored until the appropriate time, at which data can be re-encrypted under the current key. In this way, key rotation for data transmitted between a user and a data storage device, system, or service can be performed quickly without need to decrypt and re-encrypt all of the data for each rotation. Further, the data can be stored encrypted under a key that is never exposed outside the data storage device. When the data is to be read from the device, it can be decrypted using the secure key and then re-encrypted under the current user key. The secure key inside the data storage device, or the "internal" key as referred to herein, can also be rotated to cause the stored data to be re-encrypted under a new key generated inside the data storage device. The re-encryption can occur as a result of a failure, tamper event, or other such occurrence. Various other functions can be implemented within the various embodiments as well as discussed and suggested elsewhere herein.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

In an example wherein an storage operation command is to be transmitted to the appropriate data storage device in the provider embodiment, a digitally signed request, such as an API request, can be received that may be formatted in various ways in accordance with various embodiments. For example, in some embodiments, the request is a web service request received over a network. The request may be transmitted in accordance with an application level protocol, such as the HyperText Transfer Protocol (HTTP). The request may be formatted such that fulfillment of the request involves the performance of at least one data storage operation and therefore transmission of a storage operation command such as described herein. A cryptographic key may be accessed for verifying a digital signature of the received request. Accessing the cryptographic key may be performed in various ways in accordance with various embodiments. For example, in some embodiments one or more features of the request are used to select a suitable cryptographic key from a plurality of cryptographic keys. An identity of an entity that submitted the request may be associated with the cryptographic key that is usable to verify digital signatures submitted by that identity. As another example, the request may include an identifier of a cryptographic key that enables selection of a suitable cryptographic key based in part on the identifier included in the request. Generally, any way by which a suitable cryptographic key usable for verifying the request is determinable may be used.

After accessing the cryptographic key, a determination can be made as to whether the digital signature is valid. In some embodiments, the cryptographic key is a symmetric cryptographic key and determining whether the digital signature is valid may include generating a reference digital signature of the request (or portion thereof) and determining whether the reference signature matches the digital signature that was received with the request. If it is determined that the signature is not valid, the request may be denied. The request may be denied in various ways in accordance with various embodiments. For example, in some embodiments denying the request includes providing a response to the request that indicates that the request is denied and/or indicates one or more reasons for its denial. Other ways by which a request may be denied may involve performing no additional operations in connection with the request. Generally denying the request may include any suitable way of avoiding fulfillment of the request.

If, however, it is determined that the signature is valid, an appropriate signing key can be accessed. In one embodiment, a signing key is a cryptographic key usable to digitally sign a storage operation command to enable submission of the storage operation command along with the digital signature such that the digital signature can be successfully verified upon receipt and the storage operation command will, as a result, be fulfilled. The signing key that is accessed may vary in accordance with various embodiments. In some examples, the signing key is the same cryptographic key used to verify the digital signature of the request. In other examples, the signing key is a key derived (such as in accordance with various techniques described herein) based at least in part on the cryptographic key used for verifying the digital signature of the request. In yet another example, the signing key may be a cryptographic key from which the cryptographic key used for verifying the digital signature of the request is derived. In yet another example, neither the signing key nor the cryptographic key used for verifying the digital signature of the request is derived from the other. It should be noted that in embodiments where the cryptographic key used for verifying the digital signature of the request and the signing key are the same, the operation of accessing the signing key may have already been performed and thus may be considered to not be a separate operation.

Regardless of how the signing key is accessed, a storage operation command can be generated. In one embodiment, the storage operation command is a command to perform a data storage operation that matches the request that was received. For example, an application programming interface of a system through which API calls are submittable may have a variety of API calls that may be made to effect data storage operations. The various types of API calls that can be made may correspond to types of storage operation commands that are transmitted as part of fulfillment of the API calls. Further, generating a storage operation command may include populating a template for a command with data which may be data received in the request. As an illustrative example, if the request is an API request to store data, the storage operation command may include or otherwise specify the data to be stored that was included in the request. Once the storage operation command has been generated, the storage operation command can be digitally signed, which as discussed above may include using the accessed signing key to generate a digital signature based, at least in part, on the generated storage operation command. Once the storage operation command has been digitally signed, the storage operation command and the digital signature that was generated can be transmitted to data storage, such as at least one compute-enabled storage device as discussed herein, where at least one compute-enabled storage device can be configured to verify the digital signature using its own copy of the signing key (which it may have to derive, in some embodiments) and, upon verification of the digital signature, fulfill the storage operation command.

In this process a storage command is transmitted as a result of a received API request being fulfilled. Storage commands may be transmitted in other ways as well. For example, in some embodiments a system that receives API requests is operable to fulfill the API requests by performing log operations where the log operations are transmitted at a later time to another system that processes a log in order to persistently store data in accordance with the operations that were performed. A system that receives API requests may, for instance, utilize in a memory copy of a database to provide low latency access to the database through, for example, appropriately configured database queries. Thus, the system may provide quick performance of fulfillment of API requests by utilizing the in-memory copy of the database. To maintain the persistently stored copy of the database, another system may maintain the copy of the database in persistent storage. The system with the in-memory copy of the database may transmit logs of the operations that were performed which may then be processed by the system with the persistently stored copy of the database in order to update the persistently stored copy of the database asynchronously with the API requests that were received.

A data storage command may be configured in accordance with a data storage command protocol, which may be a structured query language (SQL) command, a binary input/output (I/O) protocol, a block-level storage operation command or otherwise. Other examples include the small computer system interface (SCSI) and serial ATA. Variations of such protocols may also be used, such as Internet SCSI (iSCSI) and SCSI over Fiber Channel. The data storage command may be transmitted over another protocol, such as by encoding the command in a data packet transmitted over a network. For example, the command may be encoded in a TCP/IP packet or Fiber Channel (FC) packet. While examples of specific protocols are provided for the purpose of illustration, the techniques described herein are extendible to other protocols including, but not limited to, proprietary protocols. Further, such a binary I/O protocol used with the techniques described herein may include the ability to encode policy (to be enforced by a signature verifying entity, for example), bearer tokens, cookies, cryptographic key identifiers, and/or other metadata. Generally, a storage operation command (also referred to as a data storage operation command) may be any digital encoding of a command and associated metadata that is receivable by a data storage system to cause the data storage system to fulfill the command (in accordance with the metadata, if applicable). Further, storage operation commands may be transmitted in plaintext (i.e., unencrypted) for to avoid latency caused by the need to perform encryption/decryption operations.

In at least some embodiments, the data storage can comprise at least one data storage device, such as a solid state drive (SSD) or Serial ATA (SATA) drive, that has processing or "computing" capacity onboard that enables the device to perform actions such as may involve the authenticating of commands. These commands might be associated with various systems, devices, components, or entities, such as software guide extensions (SGX) enclaves, hypervisor guests, or customers of a provider, among others. Such a "compute-enabled" storage device can receive a digitally signed storage operation command, for example, and authenticate the command using the appropriate key stored in the device.

In conventional data encryption approaches, a key is sealed to the trusted code (i.e., to a trusted data enclave) and the storage system is unaware of the key, as a request indicates to store encrypted text at a particular offset, for example, and later provide that encrypted data back in response to a subsequent request. The storage device does not have access to the cleartext (or plaintext) associated with the encrypted data, and thus cannot perform various processing tasks related to the data. If the storage device is compute-enabled, and is able to obtain the cleartext instead of just the ciphertext from the encrypted data, the storage device can perform various additional processing tasks, such as to append the data to an existing list, increment a particular value, or otherwise semantically interpret the storage command. In order to be able to access the cleartext from the encrypted data, however, the compute-enabled storage device needs to have access to the key that was used to encrypt the data. A request (e.g., a SATA call or SCSI call) received to the storage device can have appended, or prepended, authentication information that includes at least some identification data. The compute-enabled storage device can process data for the request, as may involve various mathematical and string manipulation tasks, and determine whether the source claiming to be executing the command is actually the party executing the command. If so, another determination can be made as to whether that party, once authenticated, is also authorized or permitted to execute the command. If so, the compute-enabled storage device can execute the command as appropriate.

Figure 2A:
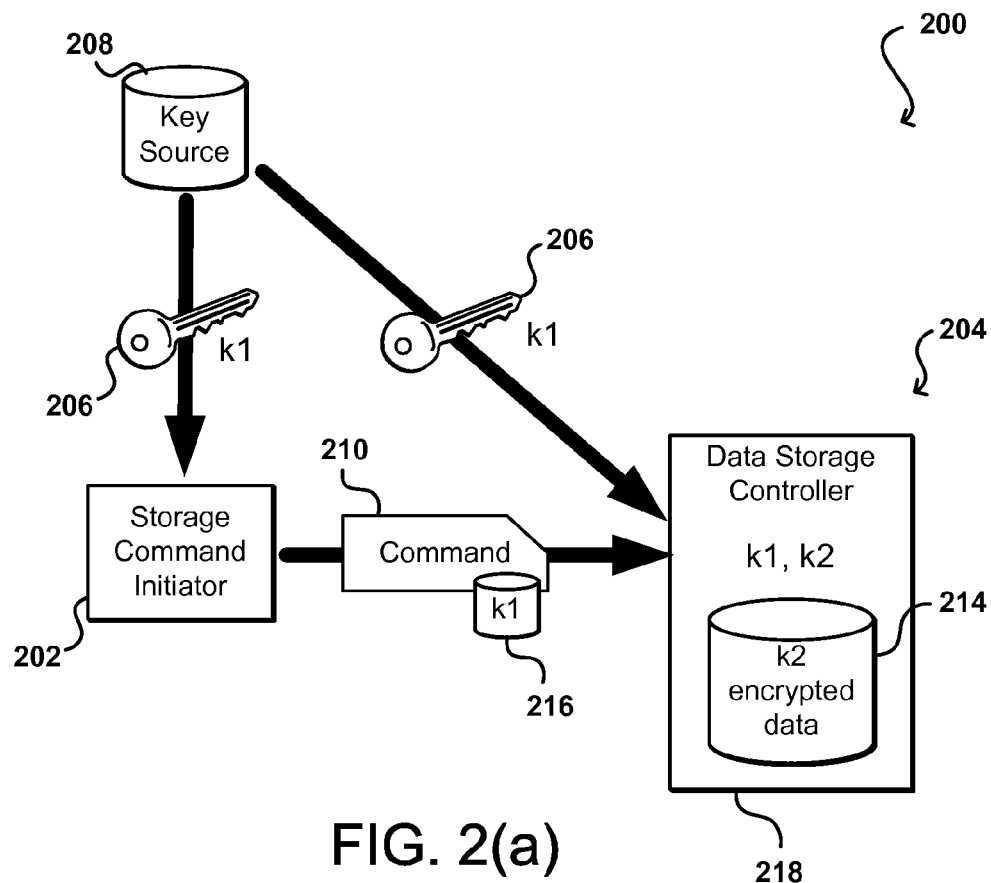
FIGS. 2(a) and 2(b) show an example of an environment in which data encrypted under a first key can be stored encrypted under a second key in accordance with various embodiments.

FIG. 2(a) illustrates an example environment 200 in in which various embodiments can be implemented. This example environment 200 includes a storage command initiator 202 and data storage 204, such as a data storage system or service that can include one or more data storage devices. The storage command initiator 202 may be implemented in various ways in accordance with various embodiments. For example, the storage command initiator can be a computer system or client device that is operable to generate, transmit, and receive input/output commands, data read and write requests, and other such communications. In some embodiments, the storage command initiator can be a process executing in a guest in a hypervisor provided in a multi-tenant environment by a multi-tenant service provider. The storage command initiator can issue storage operation commands to be performed by another system, service, or component such as described in more detail below. These commands can be issued over a network, such as in the form of a series of data packets, but can also be transmitted over other mechanisms such as a storage bus that utilizes an embedded storage protocol. The data storage 204 can be a data storage system, service, or device, for example, that is enabled to perform various operations, on one or more data storage devices, in response to data storage commands 210, where the commands generally relate to the persistent storage of data. In some embodiments the data storage system is a backend system of a database system that may be operated as part of a database service. The backend system can include one or more hard drives with spinning magnetic media and/or solid state media, and generally devices and systems of multiple devices that persistently store data. While devices that persistently store data are used throughout for the purpose of illustration, the techniques described herein are useable in connection with other data storage systems that do not necessarily persistently store data such as data storage systems that maintain data in volatile memory without persistently storing the data. The data storage service can include one or more data storage devices which can each store data for one or more customers or users, and may partitioned as known for such purposes. The service can also include one or more data storage controllers, which can be internal or external to any of the physical storage devices, and in at least some embodiments each physical data storage device can have its own data storage controller 218 and non-transitory computer-readable storage medium 214 for storing data. In at least some embodiments the data storage devices can be configured to perform various operations on the data as well, as discussed elsewhere herein, as may include data transformation, de-duplication, or compression operations, among others. Data can be compressed before it is written to storage in order to conserve storage capacity on the device and reduce write amplification as may be associated with garbage collection and overwrites.

As mentioned, a storage command initiator 202, such as a client device, might want to cause data to be stored in the data storage service 204 in an encrypted form. In order to accomplish this, the storage command initiator 206 can receive a cryptographic key from an appropriate key source 208, such as a key management service, although in other embodiments a client device can generate its own keys for such purposes. In some instances the storage command initiator can cause the encrypted data to be sent to the data storage service to be stored encrypted under that key. In various embodiments, the both the storage command initiator 202 and the data storage service 204 have access to instances of the same cryptographic key 206 that is used to encrypt the data for transmission. The cryptographic key 206 may be, for example, a symmetric or asymmetric cryptographic key useful for the performance of various cryptographic algorithms. Examples of cryptographic algorithms include those discussed above and encryption/decryption algorithms, such as may include modes (e.g., XTS) of the advanced encryption standard (AES), the data encryption standard (DES), triple DES (3DES), Serpent, Twofish, blowfish, CAST5, RC4 and the international data encryption algorithm (IDEA), among others. In an embodiment, the storage command initiator 202 and data storage service 204 each receive a copy of the cryptographic key 206 from a key source 208. The key source 108 may be a system that manages keys on behalf of one or more entities. For example, the key source may be a computer system that securely stores cryptographic keys, providing copies of the cryptographic keys only to entities authorized to receive such copies. The key source 208 may itself receive cryptographic keys from another key source. As keys are passed from one entity to another, the keys may be scoped so that a first system with access to a first key uses the first key to derive a second key that is passed onto a second system.

In some embodiments, receipt of a cryptographic key associated with a customer of the provider enables the storage command initiator 202 to digitally sign storage commands using the cryptographic key. If the storage command initiator receives requests from a client device and submits storage commands on behalf of the customer, the cryptographic key can be usable by the storage command initiator 202 to verify requests submitted by, or on behalf of, the customer prior to digitally signing storage commands as part of fulfillment of the requests. In some other embodiments, the key source 208 may be an authentication subsystem of a computing resource service provider.

As illustrated in the example situation 200 of FIG. 2(a), the storage command initiator 202 receives a copy of a first key 206, herein referred to as k1, to be used in encrypting data to be stored by the data storage service 204. The storage command initiator 202 can submit a command 210 that includes the data 216 encrypted under k1. The command 210 can also include a digital signature in some embodiments, which can be generated using k1 or another such key or credential. In other embodiments, other credentials might be provided to enable authentication of the source of the request. These credentials can include any appropriate credentials, such as passwords, retinal scans, fingerprint data, and the like.

As mentioned, the command can be received to a data storage service 204, or a storage system or device, among other such options. The data storage service can authenticate the source of the request, such as by validating a digital signature or other such credential as discussed elsewhere herein. If the source of the request is authenticated and the command 210 is able to be performed by the data storage service 204, a data storage controller 218 of the service can determine the first key 206 associated with the source, here the customer, and attempt to decrypt the data 216. If the data was not encrypted with the appropriate key for that source, the request can be denied or operation rejected. If the data is able to be encrypted, the service can decrypt the data using k1. The decrypted data, such as may be represented in cleartext, can then be re-encrypted for storage in the appropriate data store of the data storage service.

Figure 2B:
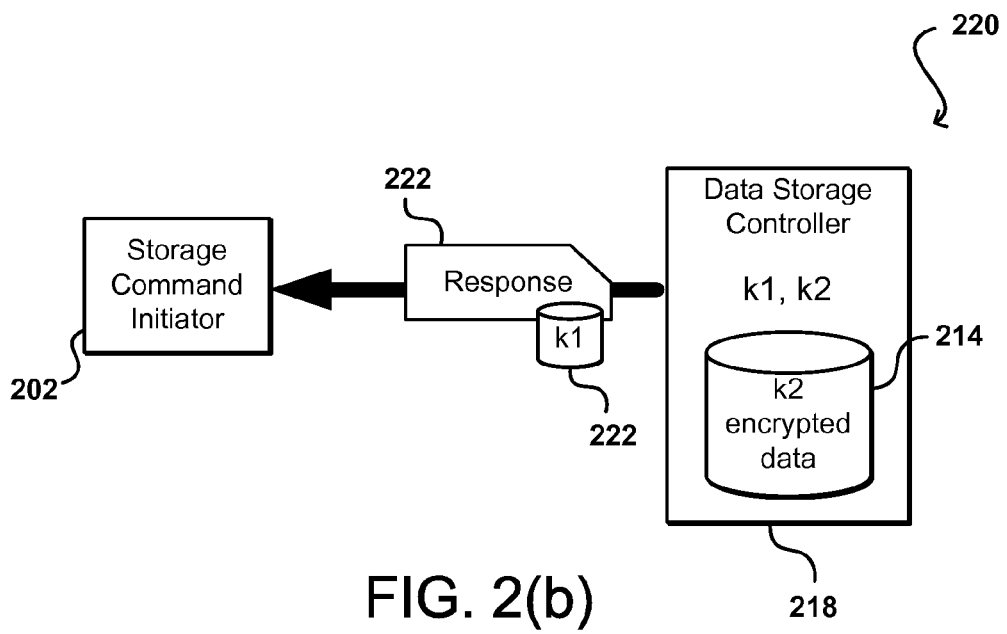

As mentioned, in order to enable the data to be stored in an encrypted format while allowing for quick rotation of externally accessible keys, a data storage device to which encrypted data can be stored can be configured to generate a second key, herein referred to as k2, which will be an internal key for the device. The second key will not be accessible, or exportable, outside the storage device, and thus each storage device used as part of the data storage service can have its own internal encryption key. Templates, formats, requirements, or other guidelines for the creation of the keys can be provided, but the data storage controller 218 (or another such component) of each storage device can be tasked with generating the respective key for data stored within that device. As illustrated in the example situation 250 of FIG. 2(b), the data storage controller 218 can also have access to any externally available keys, such as k1, used to transmit data to or from the device on behalf of any customers of the service. These externally available keys can be maintained at other places within the data storage service as well, such as a central key repository, such that each individual storage device does not have to maintain a current copy of one or more keys for each customer for which data is stored.

When a read request is subsequently received, the data storage controller can cause the stored data encrypted under k2 to be read from the data store 214 and decrypted using internal key k2. The data can then be re-encrypted using externally available user key k1, and a response 222 can be returned to the storage command initiator 202 (or another appropriate destination or address) with the requested data 222 encrypted under k1. The transmission of such data may require various validation, authentication, and/or authorization processes as discussed herein and generally known for serving data requests.

Figure 3A:
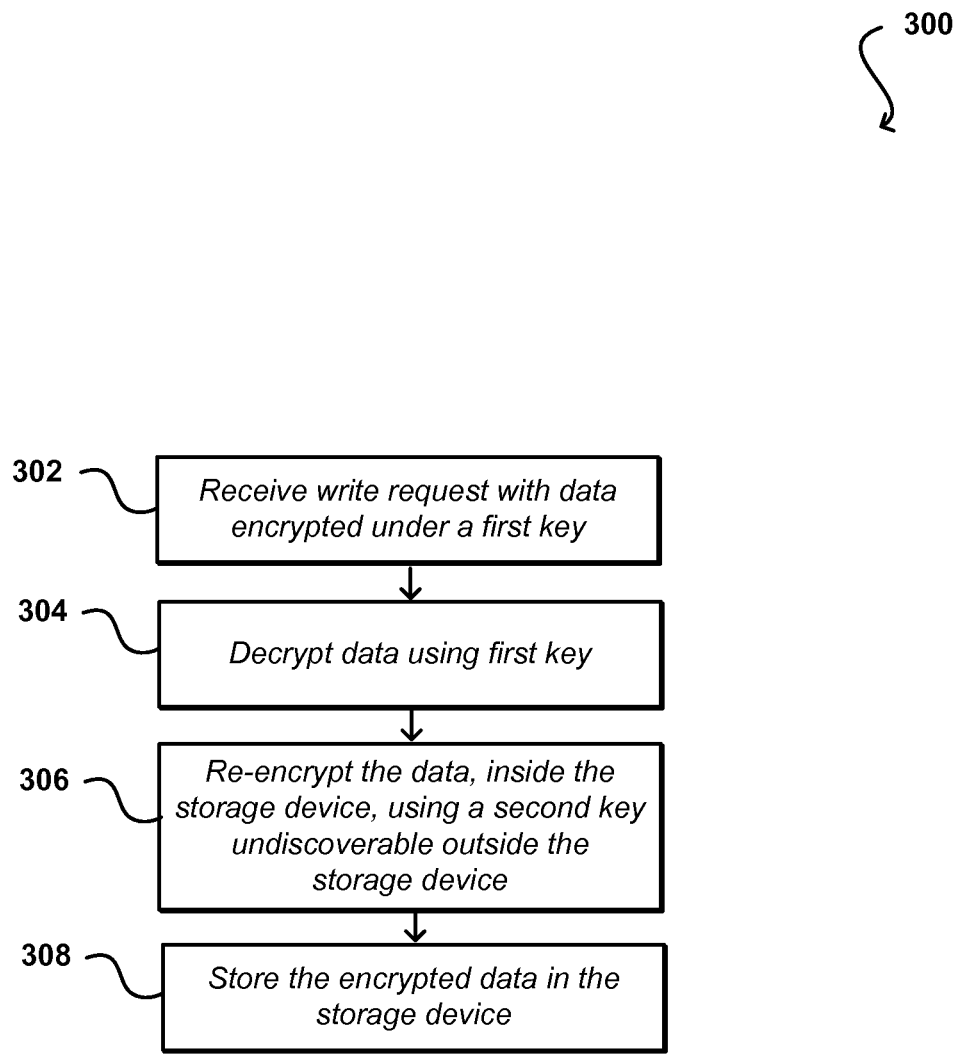
FIGS. 3(a) and 3(b) illustrate portions of an example process for re-encrypting data for storage using a key that is not accessible outside the storage device that can be utilized in accordance with various embodiments.
Figure 3B:
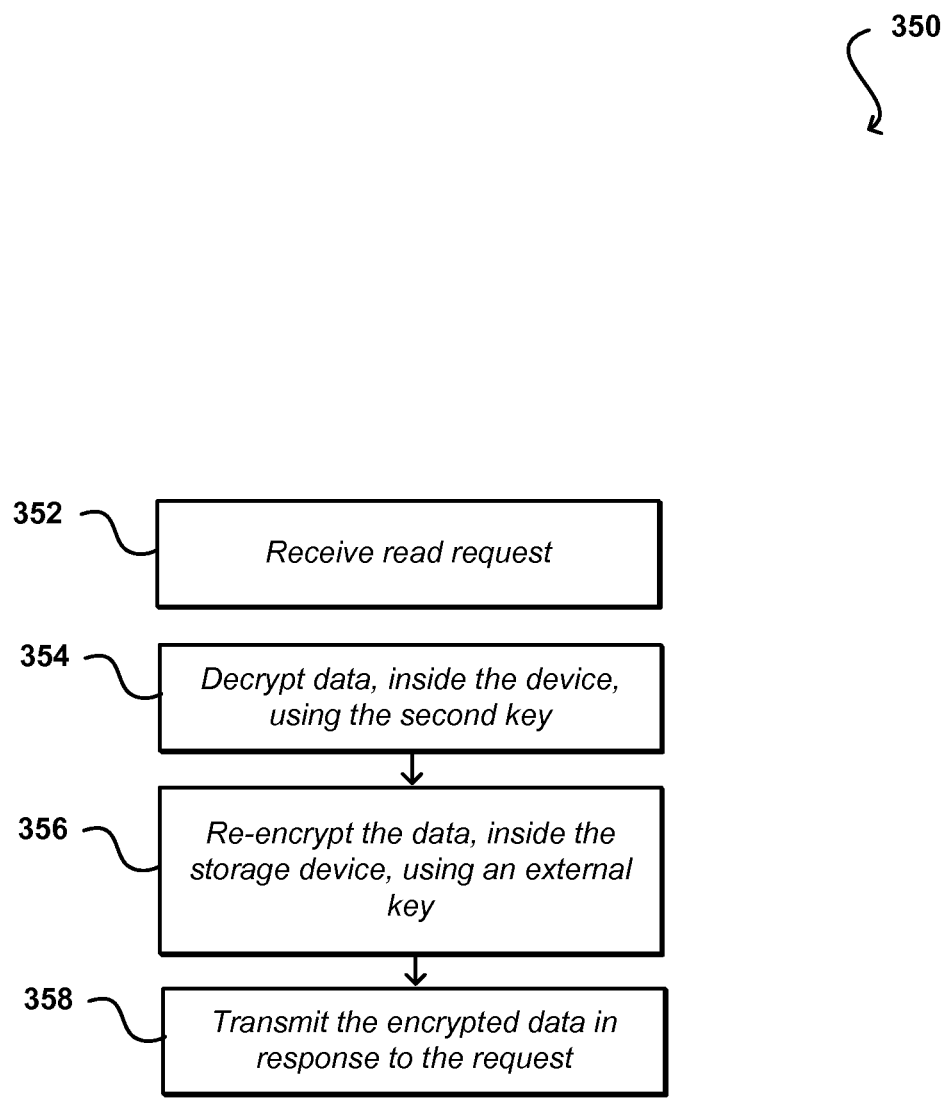

FIGS. 3(a) and 3(b) illustrate portions 300, 350 of an example process for storing and retrieving encrypted data in such an environment that can be utilized in accordance with various embodiments. It should be understood for this and other processes discussed herein that there can be additional, alternative, or fewer steps performed in similar or alternative orders, or in parallel, within the scope of the various embodiments unless otherwise stated. In this example, a write request (or input/output command including at least a write portion) is received 302 to data storage, such as a data storage service or data storage device, among other such options. In this example the write request includes data that is encrypted under a first key, such as an externally available user key as discussed herein. In order to determine whether to process the request in some embodiments, an authentication can be performed in order to authenticate the identity of the requestor. This can include, for example, verifying a credential such as a password, biometric identifier, digital signature, and the like. If it is determined that the source of the request is not, or cannot be, authenticated, the request can be denied.

The data storage device receiving the request can determine the appropriate key for the source, here the first key, and can decrypt 304 the data, received with the request, using a local copy of the first key. If the device does not have a local copy of the key, the device can request a copy of the key from an appropriate source, such as a key management service or a key store of the data storage service, among others. As mentioned, in some cases the data will be decrypted inside the device such that the cleartext (or other decrypted version) will not be available outside the storage device. Once decrypted, the data storage device can utilize a second key to re-encrypt 306 the data inside the data storage device. As mentioned, the second key can be generated internal to the data storage device, which can have processing and key management capabilities in at least some embodiments. The key can be a specific type of key, can be generated using a specified template or function, or can at least satisfy various criteria, among other such options. The re-encrypted data, encrypted under the second key, can then be stored 308 by the data storage device.

Once the data is stored by the data storage device, the data can be retrievable by an authorized party or entity, such as in the portion of the process 350 illustrated in FIG. 3(b). In this example, a read request is received 352 to the data storage device. As discussed elsewhere herein, this request could be the result of a separate request from a customer to a data storage service, where a command initiator or other such component can send requests as appropriate to the data storage devices actually storing the data needed to serve the request, among other such options. The source of the request can be authenticated in some embodiments, such as by verifying one or more credentials associated with the request as discussed elsewhere herein. Authorization and other verification steps can also be performed as discussed herein in various embodiments. If it is determined that the request cannot be authenticated (or authorized, validated, etc.) in such cases, the request can be denied. If it is determined that the source of the request corresponds to an identity authorized to retrieve or operate on the data, for example, the relevant data stored by the data storage device can be decrypted 354, inside the data storage device, using the second key inaccessible outside the data storage device. A determination can be made as to the externally accessible key (or "external" key) corresponding to the request, and the data can be re-encrypted 356 using the external key, which can be the same as, or different from, the first key. In this example the data is re-encrypted inside the data storage device, but in other embodiments the data can be re-encrypted in a data storage environment including the data storage device, or other such location wherein the unencrypted data will not be accessible to a third party. The data re-encrypted under the external key then can be transmitted 358 to the appropriate location or address, which may or may not be associated with the source of the request in various embodiments. In some embodiments the source of the read request can also be different than the source of the write request(s) that caused the data to be stored in the data storage device. In some embodiment there is no authentication and a requestor can receive a copy of the re-encrypted data, which the recipient will be unable to decrypt without a copy of the appropriate key.

Figure 4A:
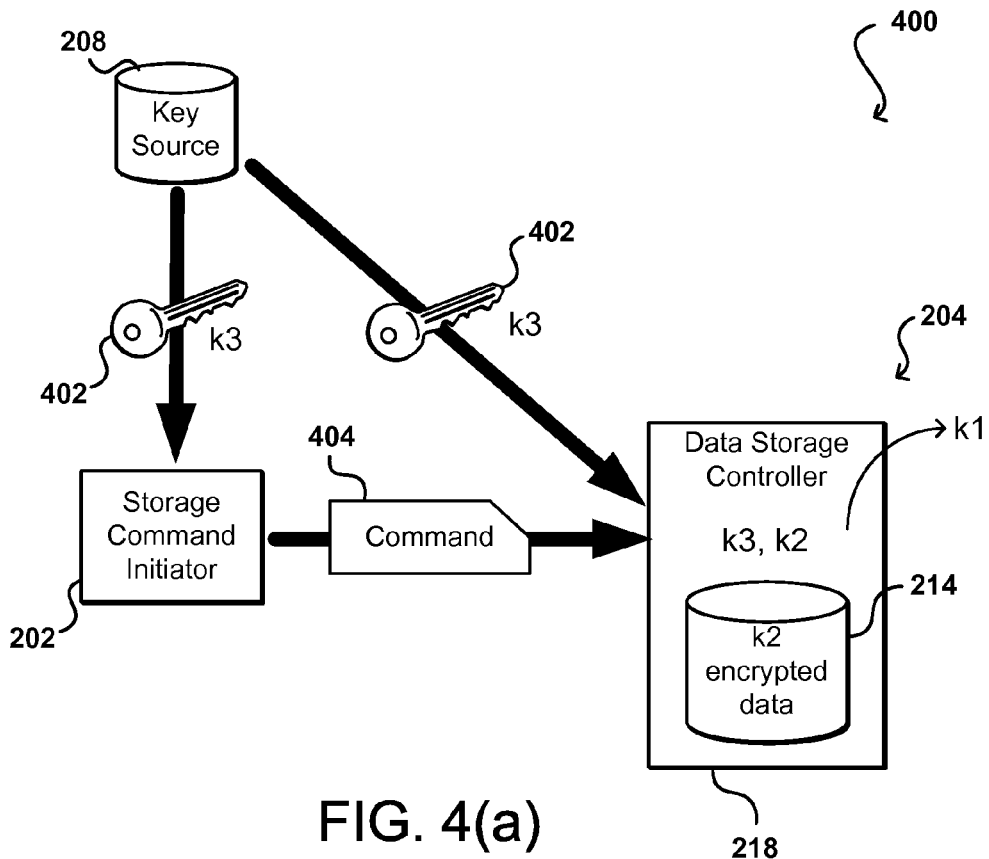
FIGS. 4(a) and 4(b) illustrate an example environment wherein the key used to encrypt data for transmission is changed while the data is still stored using a key not accessible outside the storage device that can be utilized in accordance with various embodiments.

In some embodiments, the key that is used to re-encrypt the data might be different from the key that was used to write the data. For example, in the situation 400 illustrated in FIG. 4(a) a third key 402 can be issued from a key source 208, such as the key management service mentioned previously, to the data storage service 204 storing the encrypted data. It should be understood that reference numbers for similar elements may be carried over between figures for purposes of simplicity of understanding but that such usage should not be interpreted as a limitation on the scope of the various embodiments unless otherwise specifically stated. The key source 208 might issue a new key, here the third key 402, for any of a number of reasons, such as at the request of a customer associated with a first key that was used to previously encrypt customer data or as part of a key rotation process, among other such options. The generation and/or providing of a third key for such purposes may require an authentication in some embodiments, or at least proof of possession of the first key. A customer, or other storage command initiator 202, can also receive a copy of the third key 402 in order to access and interact with data that was previously encrypted by that customer using the first key and is now stored by the data storage service encrypted under the second key. If the customer wants to perform an action with respect to the new data, the customer can then utilize the third key if appropriate, such as to generate a digital signature to accompany the corresponding input/output command 404. In some cases the customer will not utilize the third key with the command 404, but will instead store the key for usage with any data received in response to the command that is encrypted under the third key.

Figure 4B:
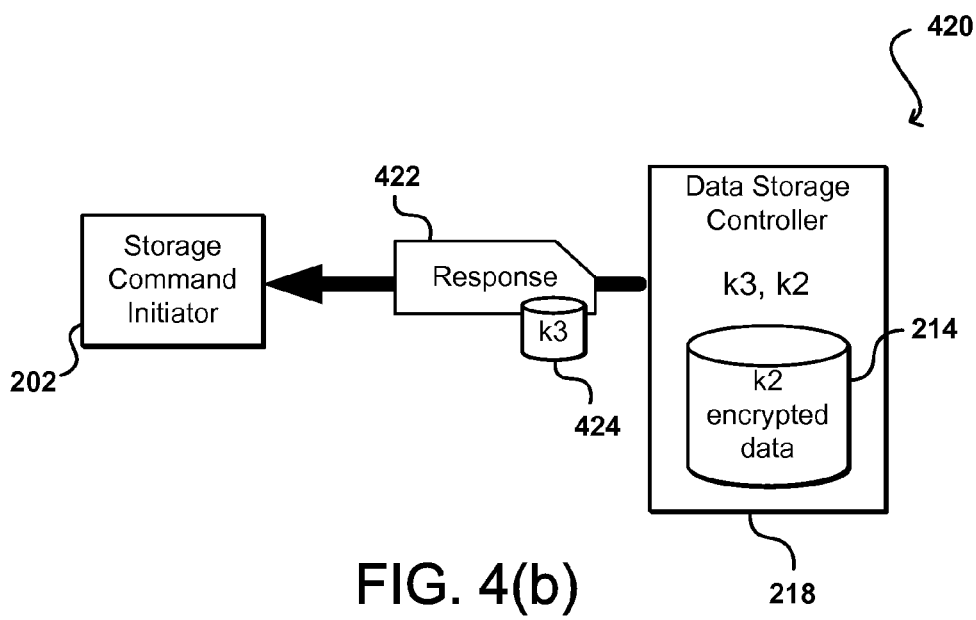

As illustrated in the example situation 420 of FIG. 4(b), the data storage controller can store a copy of the third key, k3, such that any subsequent response or action requiring re-encryption can be performed using the third key. In this way, it will appear to the customer that the data was encrypted using the first key and re-encrypted under the third key without any actual re-encryption with the third key occurring until such time as it is needed. If no request is received while the third key is active, the stored data may not be re-encrypted using the third key. The data that is stored will be encrypted under the second key that is internal to the data storage device, and will not be re-encrypted under an externally available key until such time as the data is to be transmitted from the data storage service. When the command 404 is received by the data storage service, the data storage controller 420 can use its copy of the third key, determined to correspond to the customer or other command storage initiator 202, to re-encrypt the data with the third key after it is decrypted, inside the relevant data storage device, with the second key. The relevant re-encrypted data 424 can then be sent to the storage command initiator 202, or another appropriate destination or address, using an appropriate response 422. The response can then be decrypted using the current key, which in this example is the third key.

Figure 5:
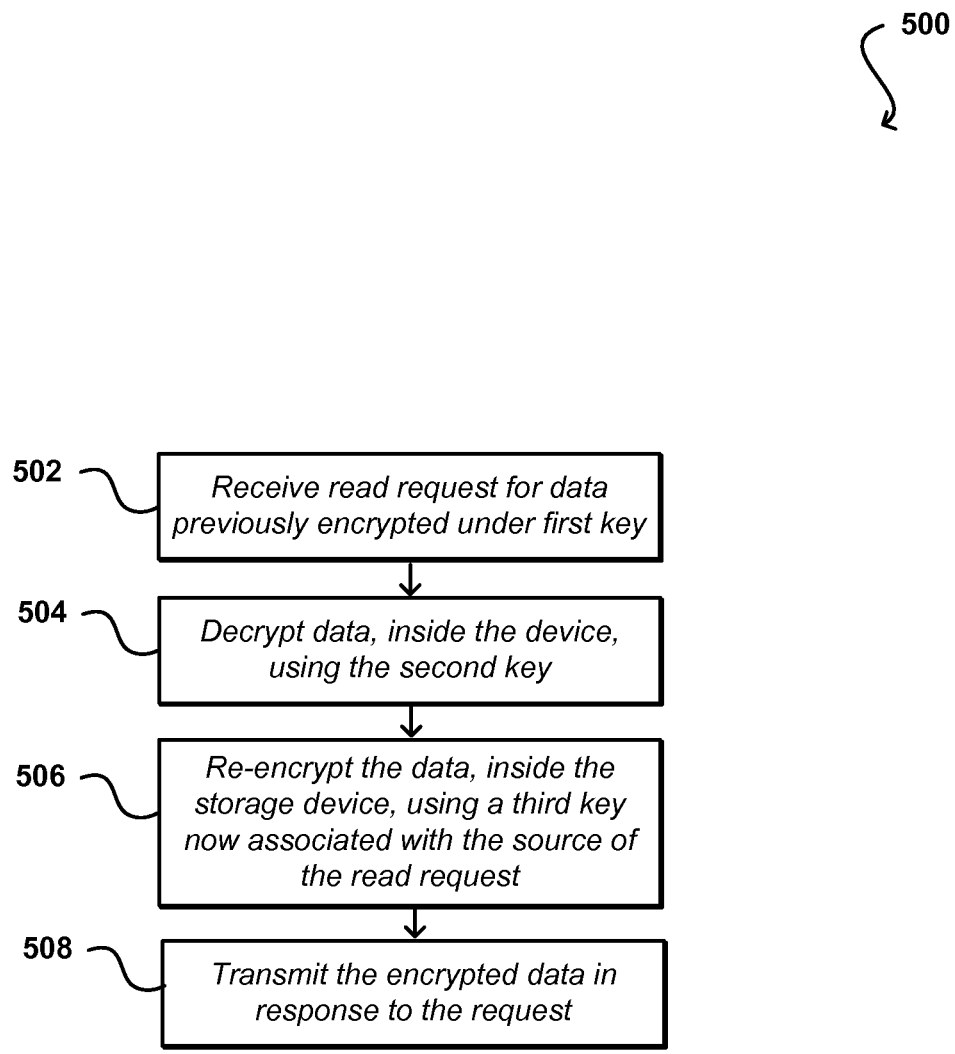
FIG. 5 illustrates an example process for changing the key used to encrypt data for transmission, while the data is still stored using a key not accessible outside the storage device, that can be utilized in accordance with various embodiments.

FIG. 5 illustrates an example process 500 for performing such a key change, where an entity external to the data storage device will be able to switch keys for encryption and decryption of the data without knowing about, or at least having access to, an internal key used by at least one data storage device to store the data. In this example, a read request is received 502 to a data storage device, for example, for data that was previously encrypted under a first key when received by the data storage device. As discussed above, the data was decrypted using the first key then re-encrypted using a second, internal key for storage inside the data storage device. The source of the request can be authenticated using any of various approaches discussed or suggested herein, in some embodiments, and if it is determined that the source cannot be authenticated (or is not authorized, etc.) then the request can be denied. If the source of the request can be authenticated and/or is authorized to access or retrieve at least a portion of the stored data, the relevant data can be decrypted 504 inside the data storage device using the second key which is not accessible outside the data storage device. The data then can be re-encrypted 506 using the third key, which is the current key now associated with the source of the read request. The encrypted data then can be transmitted 508 per the read request, such that the encrypted data can be decrypted by the recipient having a copy of the third key.

In some embodiments, the rotation of the externally available key associated with a customer or other such entity can be handled in a different way. For example, in the situation 600 of FIG. 6(*a*) a set of keys 602 is sent to the data storage service 204. At least the first key 206, or other current key, can be sent to the customer, or at least a storage command initiator 202 capable of generating commands on behalf of the customer. In other embodiments the storage command initiator or customer can receive the set of keys 602 as well. The keys can have associated timestamps or otherwise be ordered or numbered such that the keys can be rotated in the desired order at the appropriate times, although other approaches for rotating the keys can be used as well as known or used for the rotation of keys or other such credentials. For example, the data storage controller 204 can store a copy of all the keys, or at least the keys that are current keys or keys that will become the current key through a rotation process. The data storage controller 218 for a device can store both the current key and the internal key in a readily accessible location, and can store the remaining externally accessible keys for use at a later time. When a storage command initiator 202 submits an input/output or data storage command 210, for example, that command can include a signature 212 or other credential, which can be encrypted using the current first key, and data 216 that is encrypted using the first key, as discussed previously. A data storage device receiving the command, or at least a portion of the command, can decrypt the data using the current first key then re-encrypt the data using a second, internal key for storage in a data store or non-transitory storage medium 214 internal to the device.

Figure 6A:
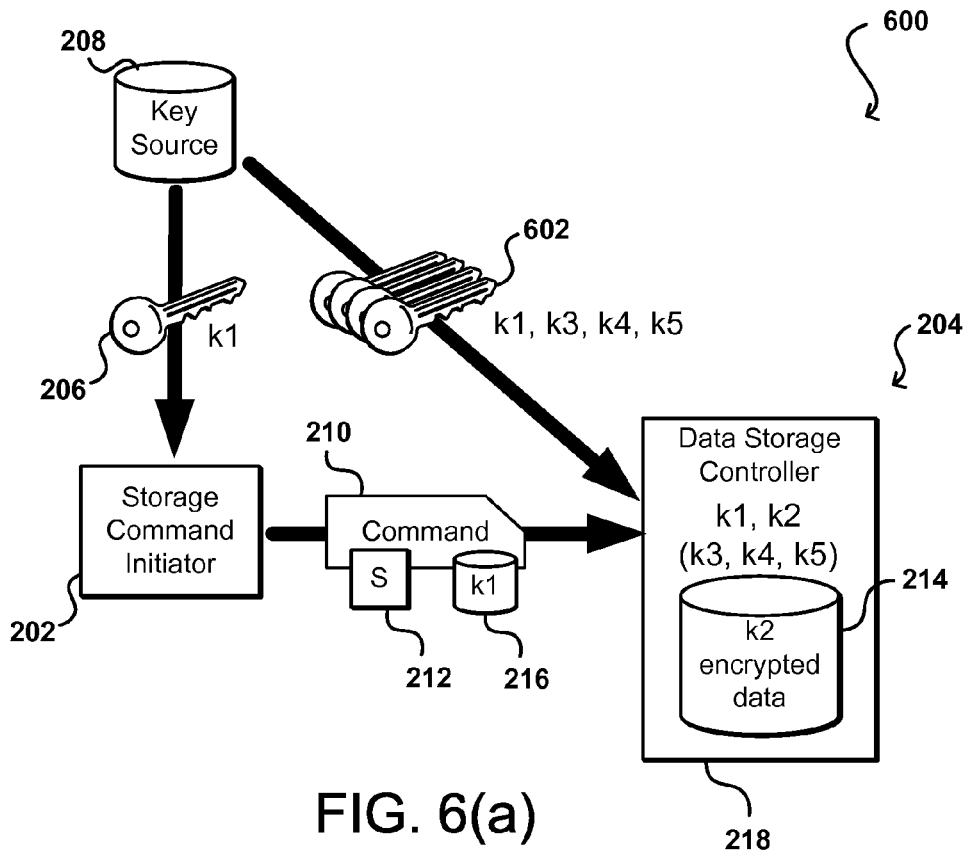
FIGS. 6(a) and 6(b) illustrate an example environment wherein keys used to encrypt data for transmission are rotated over time while the data is still stored using a key not accessible outside the storage device that can be utilized in accordance with various embodiments.
Figure 6B:
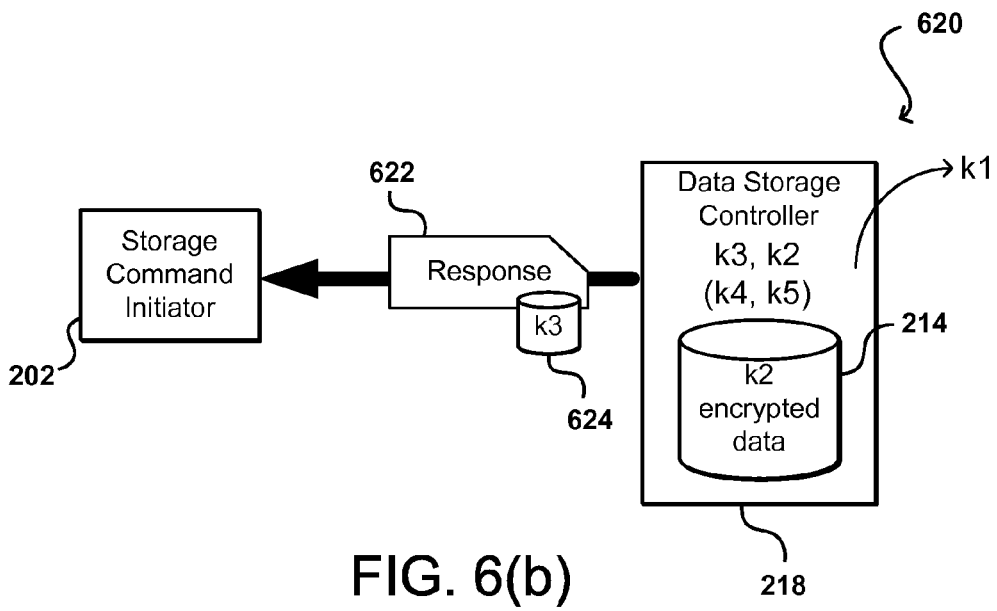

At a subsequent time, the current key for encrypting data for the customer to be transmitted from the device can be changed from the first key to a third key, where that third key was previously provided to the data storage service as part of the set of keys, as illustrated in the example situation 620 of FIG. 6(*b*). For example, the data storage controller can compare the time that the request is received with a timestamp or table indicating the current external key out of the set of keys. In this example, the data storage controller 218 can determine that the first key is no longer current and that the third key is to be used for encrypting data associated with the specified customer. Accordingly, the data storage controller 218 can cause the corresponding data to be read from the data store 214 on the device and decrypted using the internal second key, which is not accessible outside the storage device. Since the first key is no longer current, the key can be deleted or otherwise marked as no longer current, etc. The determination that the third key is the current key for the customer can cause the relevant data to be encrypted using the third key, and the encrypted data 624 can be sent with the appropriate response 622 to the command storage initiator 202 or another appropriate destination or address. At a later time, a fourth key stored by the data storage controller can be determined to be the current key, and so on. It should be understood that other mechanisms can be used to cause the external keys to rotate as well, such as a request from the customer or key management service, a tamper or power event, etc.

Figure 7:
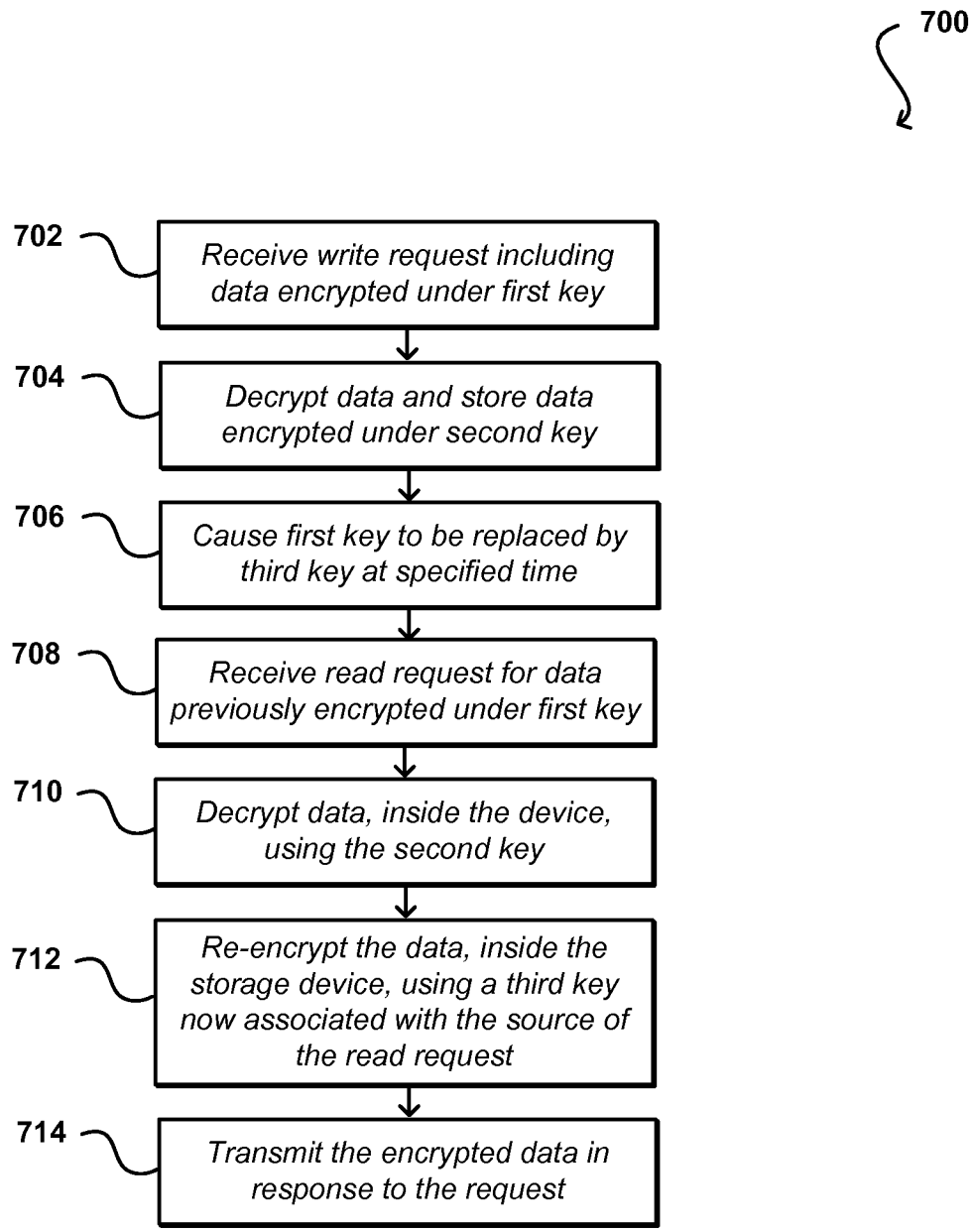
FIG. 7 illustrates an example process rotating keys used to encrypt data for transmission, while the data is still stored using a key not accessible outside the storage device, that can be utilized in accordance with various embodiments.

FIG. 7 illustrates an example of such a process 700 for enabling external key rotation, without a compulsory re-encryption of all the data, that can be utilized in accordance with various embodiments. In this example, a write request (or other I/O command including at least a write portion) is received 702 where attached data is encrypted under a first key associated with a customer. The data is decrypted 704 using the first key, and re-encrypted (inside at least one storage device) using a second key that is not accessible outside the relevant storage device. The data encrypted under the second key is then stored in the relevant storage device. As mentioned, the storage device may have received two or more keys associated with the customer, where one of the keys is the currently active key and at least one key is a key to be used in the future. As mentioned, in some embodiments a manual key rotation can be triggered by the customer, a key management service, or another such entity. For example, a manual key change operation may be performed that requires proof that the requestor is aware of the old outside key, which could involve presenting a copy of the outside key or issuing a specific command authenticated with, or encrypted using, the old outside key. In this example, each key has an associated timestamp or other temporal data associated such that the third key can be caused 706 to be the current key, replacing the first key for the customer, at a specified time. The second key that is internal to the storage device can remain the same, but the external key used to transmit data on behalf of the customer can be updated to the third key.

Subsequent to the current key being changed to the third key, a read request can be received 708 for the data that was previously encrypted under the first key associated with the customer. In some embodiments the source of the read request can be authenticated as discussed elsewhere herein, and if it is determined that the source cannot be authenticated (or authorized, validated, etc.) then the request can be denied. Otherwise, the relevant data stored in the storage device can be decrypted 710 using the second key that is accessible only inside the data storage device. The data can then be re-encrypted 712 inside the storage device (or elsewhere) using the third key now associated with the customer and/or the source of the read request. The encrypted data can then be transmitted 714 in response to the request, with the data only having been re-encrypted under the third key in response to the request for the data. If the data had not been requested until the key was changed to a fourth key, that data may never have been encrypted under the third key.

There may be other situations where a key rotation may be desired as well. This can include not only an externally accessible key but a key that is only accessible inside a storage device as well. For example, it may be desirable to change keys in response to a power loss or tamper event in order to increase the security of the data. A "tamper event" as referred to herein relates to any detectable action that is indicative of a potential attempt to tamper with the storage device, in order to obtain access to the data stored on the device or otherwise modify the operation or storage performed by the device. It thus might be desirable to change the key in response to the storage device being pulled out of a rack, disconnected from a power or communication cable, etc. A storage device can be programmed to rotate the key upon a boot or startup action, which can be indicative of a power loss or other such action. One approach to providing for tamper-based rotation is to include one or more sensors or other such components on a device cable, which can convey to the device when various actions occur and/or are detected. For example, in the example cross-section 800 of FIG. 8(*a*) a SATA connector is shown (although other connectors can be used as well) that has a number of connection pins or pads 804 in the connector housing 802, where the housing is typically formed of a non-conductive plastic. A pair of conductive pads 806 can be placed on an exterior surface of the connector housing 802, which can contact a conductor on the cable housing such that an electrical connection is formed when the cable is attached to the connector. When a cable is pulled from the SATA connector, the electrical connection between the conductive pads 806 and the cable conductor will be broken, which can trigger a key rotation. An establishment of such a connection can also cause a key rotation in some embodiments. At least one of the pads 806 can include, or be in contact with, a connection sensor operable to communicate to a data storage controller or other such component that there has been a cable connection or disconnection action. The example cross-section 820 of FIG. 8(*b*) illustrates another example configuration wherein a physical switch 822 is incorporated into the connector housing 802. The switch 822 can include, or be in contact with, a sensor that can indicate to a storage device controller when a cable is connected to the connector as well as when the connector is not connected to a cable. It should be understood that for the switch and other sensors herein that the switch or sensors can be placed on an inside, outside, or top of the connector (or cable) based at least in part upon whether the connector is a male or female connector, or another physical aspect of the connector or cable. In this example, a cable being connected can cause the switch 822 to be depressed, or in a closed state, which can indicate to the appropriate sensor that the cable is connected. If no cable is connected, the switch can be in an open or extended state, for example, whereby the sensor can detect that a cable is not connected. In order to provide enhanced security, a switch or sensor can be placed at or near both ends of the cable to ensure that the device is not removed by detaching the other end of the cable, etc. Switches can also be used to determine that the device is in a rack or housing, etc., by positioning one or more switches on appropriate locations of the connector, housing, or storage device. Various pressure sensors can be used to detect connections as well, with or independent of such switches, in accordance with various embodiments.

Figure 8A:
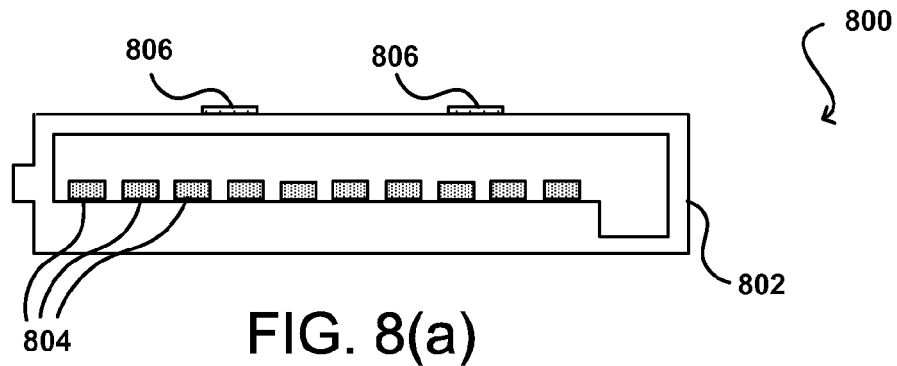
FIGS. 8(a), 8(b), and 8(c) illustrate example connector configurations that can be used to trigger a key rotation in accordance with various embodiments.
Figure 8B:
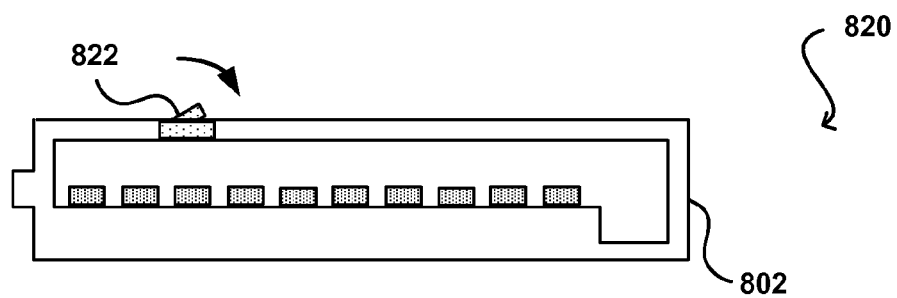
Figure 8C:
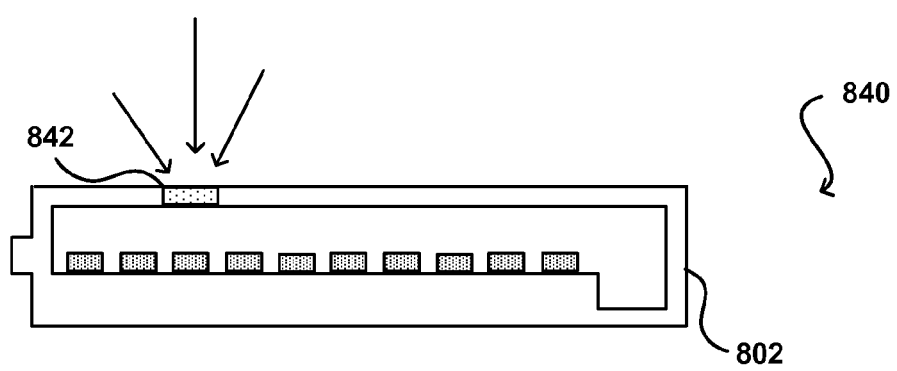

Instead of a physical switch, a sensor such as a light sensor 842 can be used as illustrated in the example situation 840 of FIG. 8(*c*). In such an example, the connection of a cable or external housing can cause the light detector to detect little to no incident light, and detection of less than a threshold amount of light can be indicative of the device being connected to the appropriate cable, rack, etc. On the other hand, detection of light above such a threshold can be indicative of the device being disconnected or removed. Any such action that is indicative of a potential tampering action can cause a key change or other such action. Sensors can be placed in other appropriate places as well, such as in screw holes, brackets, mounting hardware, and the like. Other sensors, such as location sensors or geo-coordinate determining components can be used to determine the location of a device, such that movement or presence of the device outside a particular region, or more than a determined distance from a specified location, can also trigger a key rotation in some embodiments. Motion sensors (e.g., inertial sensors, gyroscopes, accelerometers, digital compasses, and the like) can also be used to trigger a key rotation when the amount of movement and/or change in orientation meets or exceeds a specified threshold. In some embodiments, a tamper event might cause the key to be rotated to a dedicated key outside of the normal rotation, among other such options. Further, for key rotations managed inside of the disk firmware without general purpose interfaces, it can be difficult for a malicious party to attach a debugger, disassembler, or other device or process to the physical storage device to attempt to recover the internal, unexportable key.

Figure 9:
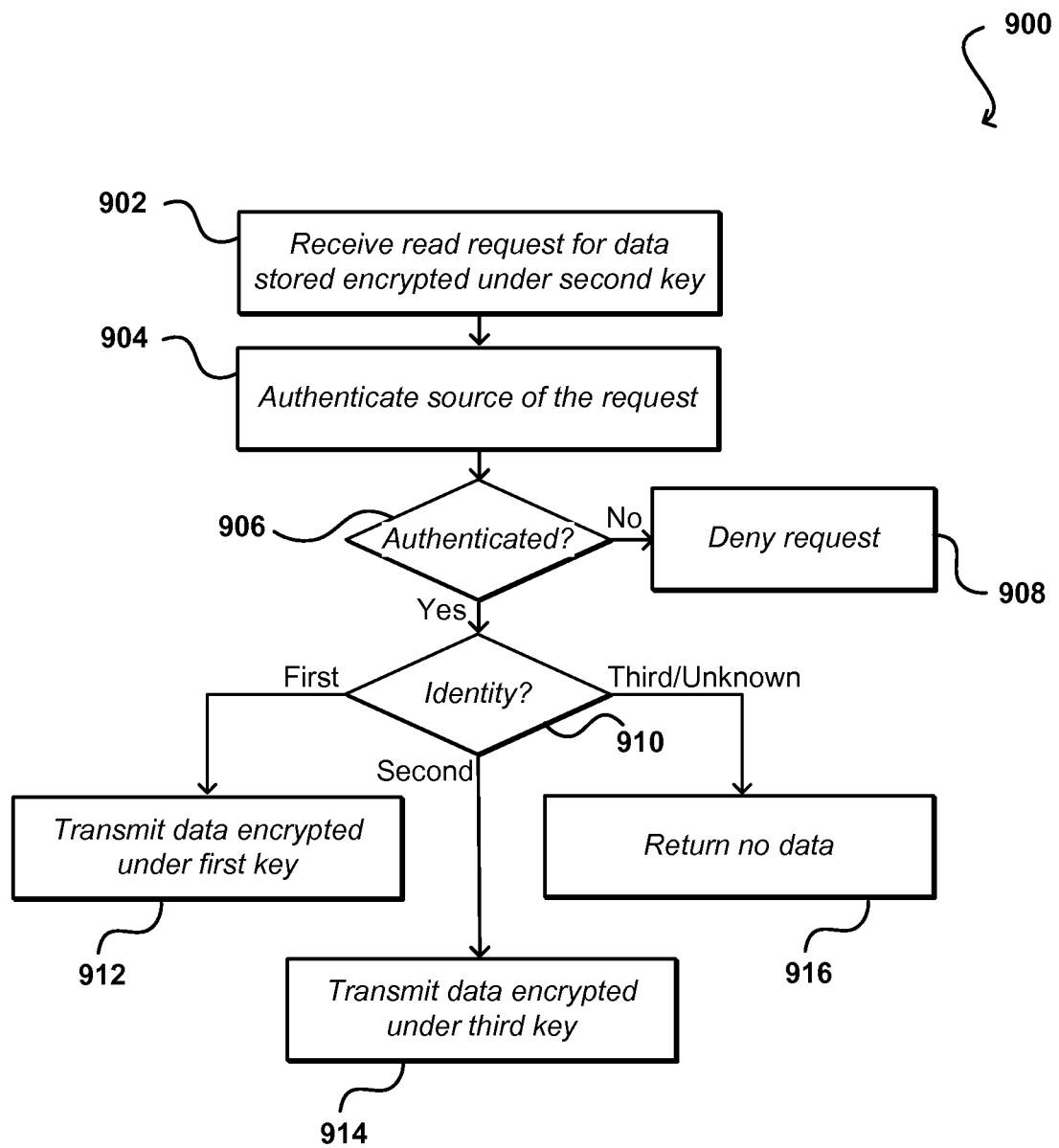
FIG. 9 illustrates an example process for re-encrypting keys for transmission using different keys for different users that can be utilized in accordance with various embodiments.

In some embodiments, there might also be different keys used for different types of operations or different users, among other such options. For example, FIG. 9 illustrates an example process 900 wherein data is encrypted under different keys depending at least in part upon the identity of the requesting entity that can be utilized in accordance with various embodiments. In this example, a read request is received 902 to the data storage device. As discussed elsewhere herein, the data stored by the data storage device is encrypted under a second key that is inaccessible outside the storage device. The source of the request can be authenticated 904, such as by verifying one or more credentials associated with the request as discussed elsewhere herein. Authorization and other verification steps can also be performed as discussed herein in various embodiments. If it is determined 906 that the request cannot be authenticated (or authorized, validated, etc.), the request can be denied 908. If it is determined that the source of the request can be authenticated to an identity authorized to retrieve or operate on the data, a determination can be made 910 as to which identity is associated with the request and what permissions that identity has with respect to the data. For example, if the identity is determined 910 to correspond to a first identity, the relevant data stored by the data storage device can be decrypted, inside the data storage device, using the second key inaccessible outside the data storage device. A determination can also be made that the first key is associated with the first identity, such that the data is then re-encrypted using the first key. In this example the data is re-encrypted inside the data storage device, but in other embodiments the data can be re-encrypted in a data storage environment including the data storage device, or other such location wherein the unencrypted data will not be accessible to a third party. The data re-encrypted under the first key then can be transmitted 912 to the appropriate location or address associated with the first identity, which may or may not be associated with the source of the request in various embodiments. In some embodiments the source of the read request can also be different than the source of the write request(s) that caused the data to be stored in the data storage device.

If, however, the identity is determined 910 to be a second identity associated with a third key, the data after decryption using the second key can be re-encrypted with the third key and then transmitted 914 to an address or destination associated with the second identity. It is also possible that the identity is determined to be a third identity that is not associated with a key or otherwise does not have permission (or is otherwise not authorized) to access the data. Similarly, it is possible that the identity cannot be determined. In such instances, the read request can be denied or at least none of the stored data will be decrypted, re-encrypted, and transmitted outside the device. As mentioned, different keys can be used for different actions, identities, destinations, etc.

In at least some embodiments, one or more stream cipher algorithms can be used to generate new keys on demand, as well as intermediate keys used in the key upgrade process. A customer, manager, or other such entity can request that a key be upgraded, and a security manager, key manager, or other such component can cause the new and intermediate keys to be generated and sent to the appropriate locations where data stored under the old key is located. In other embodiments, keys can be scheduled to be rotated at regular intervals, or at other appropriate times, and the new and intermediate keys can be generated and pushed out automatically. In some embodiments, a security manager might receive a new key to be used, and generate an intermediate key to be distributed to the appropriate locations. The intermediate key then can be provided to any location having data stored under the old key, in order to cause the data to be encrypted under the new key.

In some embodiments upgrade keys can be used that match proper prefixes of the initial key, either randomly or in some sequence. Such an approach enables keys to be optimized out for improved security and/or processing. For example, if two 128 bit sub-keys in a 1,280 bit key are the same, those keys can be canceled out to arrive at a 1,024 bit key that does not include the redundant keys. An XOR cipher will cancel out any equal sub-keys or other such values. In some embodiments, keys can be used that are always twice the length of the previous, underlying generator key. In still other embodiments, the upgrade key can always be twice the size of the generator key, but half the size of the resulting new key. For example, the old key might be 128 bits in length, with the intermediate key being 256 bits that, when processed as discussed herein, results in a new key of 128 bits in length. The upgrade key can be the pairing of the old key and the new key, which does not provide robust security but does suffice to upgrade to the new key with efficient processing.

The ability to bootstrap an authentication key to a storage device also provides additional functionality not offered by conventional storage devices. For example, a special command or read to a particular location can be used to trigger a key exchange, where a key or key form can be used to create a data context on the device. Operations authenticated with the appropriate key could have a first level of access to that data context, and operations not authenticated with that key, or authenticated with a different key, can obtain a second level of access to that data context. Rather than requiring access to a key management system, each source of a storage operation can negotiate a key with the storage device, whereby the device itself can authenticate operations. The storage device then can be responsible for honoring only those operations authenticated with the negotiated key. Any number of keys can be utilized, but specific writes or commands must the tied to the appropriate key to be processed. In some embodiments, a key can be used to select a block map, whereby different users can negotiate different keys, read or write data at offset zero, and receive different virtualized views of the zero sector.

Various approaches can be used to obtain the key for such purposes. For example, a customer or guest can negotiate a key for virtual reads and writes. In some embodiments a derived MAC key can be provide that may be encrypted to a different key that is known to be available to the storage device. Public key certificates can also be used in various embodiments. Various mechanisms can be used to provide authorizations as well. In some embodiments, a list or other collection of authorizations can be maintained that indicates which commands can be processed, or how those commands are to be processed, for different users or types of users. While some authorizations can be tied to specific keys, in other embodiments a fully flexible policy language might be used that could send requests to a key management service and can maintain a facility for receiving additional keys encrypted with a key that is burned into the storage device and not exportable.

Figure 10:
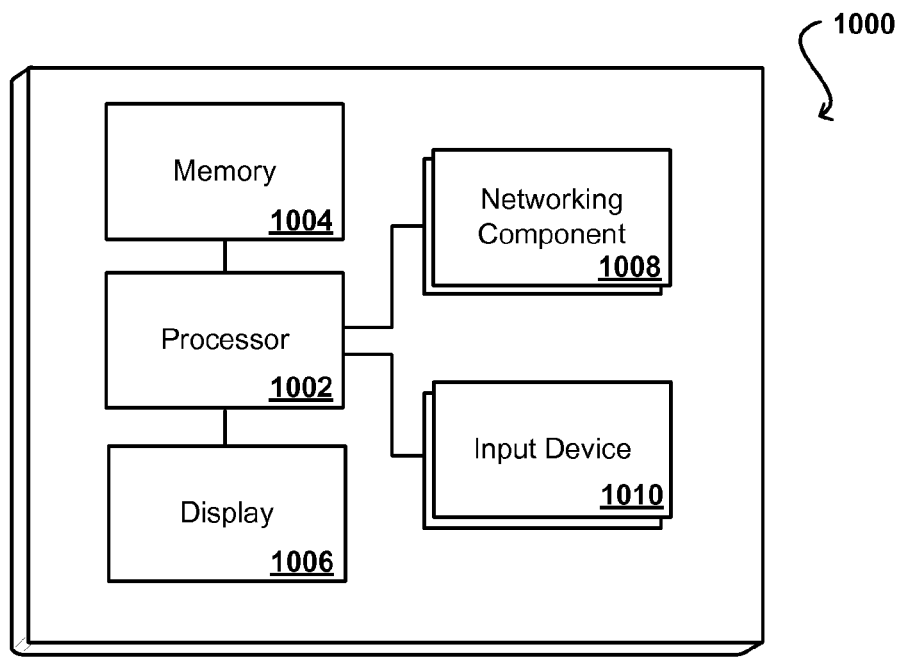
FIG. 10 illustrates example components of a computing device that can be used to implement aspects of various embodiments.

FIG. 10 illustrates a set of basic components of an example computing device 1000 that can be utilized to implement aspects of the various embodiments. In this example, the device includes at least one processor 1002 for executing instructions that can be stored in a memory device or element 1004. As would be apparent to one of ordinary skill in the art, the device can include many types of memory, data storage or computer-readable media, such as a first data storage for program instructions for execution by the at least one processor 1002, the same or separate storage can be used for images or data, a removable memory can be available for sharing information with other devices, and any number of communication approaches can be available for sharing with other devices. The device may include at least one type of display element 1006, such as a touch screen, electronic ink (e-ink), organic light emitting diode (OLED) or liquid crystal display (LCD), although devices such as servers might convey information via other means, such as through a system of lights and data transmissions. The device typically will include one or more networking components 1008, such as a port, network interface card, or wireless transceiver that enables communication over at least one network. The device can include at least one input device 1010 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 11:
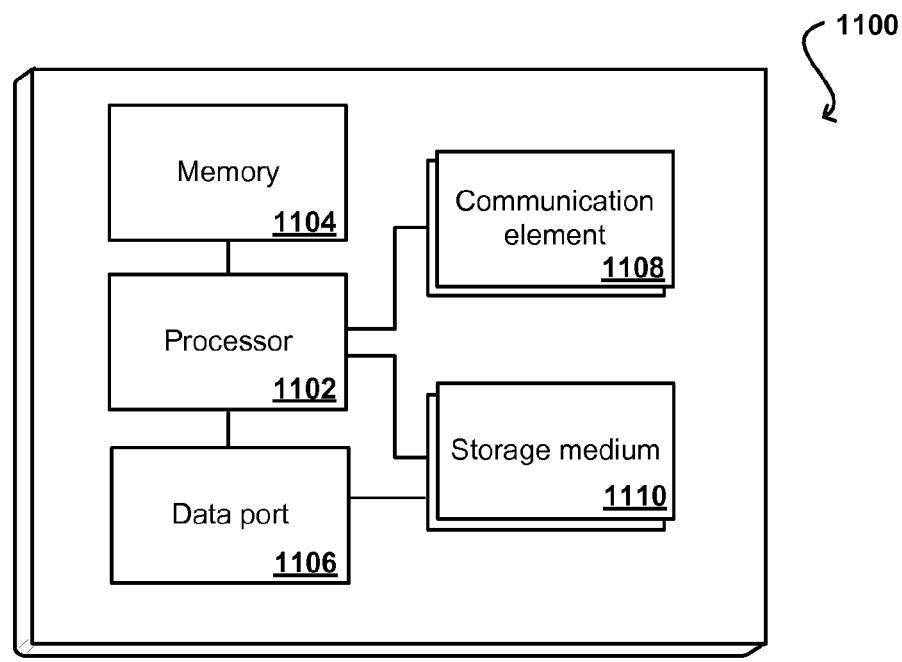
FIG. 11 illustrates example components of a storage device that can be used to implement aspects of various embodiments.

FIG. 11 illustrates a set of basic components of an example storage device 1100 that can be utilized to implement aspects of the various embodiments. In this example, the device includes at least one processor 1002 for executing instructions that can be stored in a memory device or element 1004. As would be apparent to one of ordinary skill in the art, the device can include many types of memory, data storage or computer-readable media, such as a first data storage for program instructions for execution by the at least one processor 1002, the same or separate storage can be used for images or data, a removable memory can be available for sharing information with other devices, and any number of communication approaches can be available for sharing with other devices. For a storage device the device can include one or more non-transitory computer-readable storage media 1110, which can be used to store data for one or more users, entities, or other such data sources. The device typically will include one or more communication elements or components 1108, such as network interface card or wireless transceiver that enables communication over at least one network. The device can also include at least one data port 1106, such as a SATA port, for transferring data to, and from, the device. The device can include at least one other input device able to receive conventional input from a user. This conventional input can include, for example, a push button, touch pad, touch screen, keypad or any other such device or element whereby a user can input a command to the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving data in a write request, the data encrypted under a first external key;
   decrypting the data to a storage device using a copy of the first external key stored by the storage device;
   re-encrypting, in the storage device, the data using an internal key generated within, and inaccessible outside, the storage device;
   storing the data, encrypted under the internal key, in the storage device;
   receiving a read request to access the data encrypted under the internal key;
   decrypting, in the storage device, the data using the internal key;
   determining a current external key resulting from a rotation event;
   replacing the copy of the first external key, stored in the storage device, with the current external key;
   re-encrypting the data stored in the storage device using the current external key; and
   transmitting the data, re-encrypted under the current external key, from the storage device to a destination specified by the read request.

2. The computer-implemented method of claim 1, further comprising:
   authenticating an identity of a first user, associated with the data, in order to determine the current external key from a plurality of user keys.

3. The computer-implemented method of claim 2, further comprising:
   determining at least one of an access permission or an authorization for the identity of the first user before re-encrypting the data and transmitting the data re-encrypted under the current external key.

4. The computer-implemented method of claim 1, further comprising:
determining the current external key at least in part by comparing a respective timestamp for one or more external keys to a current time.

5. The computer-implemented method of claim 1, further comprising:
determining the current external key at least in part by determining at least one task associated with the read request, the current external key selected from a set of external keys associated each associated with at least one respective task.

6. A storage device, comprising:
at least one non-transitory computer-readable storage medium for storing data;
at least one processor; and
memory including instructions that, when executed by the at least one processor, cause the storage device to:
receive, to the storage device, data encrypted under a first external key;
decrypt the data in the storage device using a copy of the first external key;
encrypt, in the storage device, the data under an internal key, the internal key generated inside the storage device and inaccessible outside the storage device;
determine a current external key resulting from a rotation event;
replace the copy of the first external key with the current external key;
store the data, encrypted under the internal key, in the storage device, the data capable of being decrypted in the storage device internally under the internal key; and
encrypt the at least a portion of the data under the current external key, in response to a subsequent read request for the at least a portion of the data.

7. The storage device of claim 6, wherein the instructions when executed further cause the storage device to:
decrypt, in response to a subsequent write request for the at least a portion of the data, the at least a portion of the data, using the copy of the current external key, before encrypting the data under the internal key for storage in the storage device.

8. The storage device of claim 6, wherein the instructions when executed further cause the storage device to:
store a copy of the current external key in the storage device; and
transmit, in response to the subsequent read request, the at least a portion of the data encrypted under the current external key, to a destination specified in the subsequent read request.

9. The storage device of claim 6, wherein determining the current external key includes executing the rotation event affecting one of the first external key or a different external key.

10. The storage device of claim 6, wherein the instructions when executed further cause the storage device to:
receive a set of external keys associated with a source of the data, each external key of the set of external keys capable of being designated a current external key for encryption of data for the source at a future time.

11. The storage device of claim 6, wherein the instructions when executed further cause the storage device to:
change the internal key to a new internal key, the new internal key generated inside the storage device and inaccessible outside the storage device.

12. The storage device of claim 8, wherein the instructions when executed further cause the storage device to:
detect, by at least one sensor in the storage device, a trigger event; and
execute, in response to detecting the trigger event, the rotation event affecting at least one of the internal key or the first external key.

13. The storage device of claim 12, wherein the at least one sensor includes at least one of a power sensor, a mechanical switch, an electrical connection sensor, a light sensor, a motion sensor, a location sensor, or a pressure sensor.

14. The storage device of claim 6, wherein the instructions when executed further cause the storage device to:
verify a digital signature of the subsequent request before decrypting the data, the digital signature generated at least in part using the current external key, the current external key associated with a source of the data.

15. A non-transitory computer-readable storage medium storing instructions that, when executed by at least one processor of a storage device, cause the storage device to:
receive data encrypted under a first external key;
decrypt the data in the storage device using a copy of the first external key;
encrypt the data under an internal key, the internal key generated inside the storage device and inaccessible outside the storage device;
determine a current external key resulting from a rotation event;
replace the copy of the first external key with the current external key;
store the data, encrypted under the internal key, in the storage device, the data capable of being decrypted in the storage device internally, using the internal key; and
encrypt at least a portion of the data under the current external key, in response to a subsequent read request for the at least a portion of the data.

16. The non-transitory computer-readable storage medium of claim 15, wherein the instructions when executed further cause the storage device to:
decrypt, in response to a subsequent write request for the at least a portion of the data, the at least a portion of the data, using a copy of the current external key, before encrypting the data under the internal key for storage in the storage device.

17. The non-transitory computer-readable storage medium of claim 15, wherein the instructions when executed further cause the storage device to:
receive the subsequent read request for at least the portion of the data;
store a copy of the current external key in the storage device; and
transmit, in response to the subsequent read request, the at least a portion of the data, encrypted using the current external key, to a destination specified in the subsequent read request.

18. The non-transitory computer-readable storage medium of claim 15, wherein the internal key is generated and stored using a tamper-resistant cryptographic co-processor in the storage device.

19. The non-transitory computer-readable storage medium of claim 15, wherein the instructions when executed further cause the storage device to:

determine at least one of a task or an identity associated with the subsequent request;

determine a corresponding external key associated with the at least one of a task or an identity associated with the subsequent request; and re-encrypt the data using the corresponding external key before causing the data to be transmitted outside the storage device.

20. A system, comprising:

at least one processor; and memory storing instructions that, when executed by the at least one processor, cause the system to:

receive data in a write request, the data encrypted under a first external key;

decrypt the data in the system using a copy of first external key stored in the at least one non-transitory computer-readable storage medium;

re-encrypt, in the system, the data using an internal key generated within, and inaccessible outside, the system;

cause the data to be stored, encrypted under the internal key, in the at least one non-transitory computer-readable storage medium;

receive a read request to access the data encrypted under the internal key;

decrypt, in the system, the data using the internal key;

determine a current external key resulting from a rotation event;

replace the first external key with the current external key;

re-encrypt the data stored in the at least one non-transitory computer-readable storage medium using the current external key;

store a copy of the current external key in the at least one non-transitory computer-readable storage medium; and transmit the data from the system, re-encrypted under the current external key, to a destination specified by the read request.

21. The system of claim 20, wherein the instructions when executed further cause the system to:

store the data encrypted under the internal key.

\* \* \* \* \*